US011578680B2

(12) United States Patent
Rockwell et al.

(10) Patent No.: US 11,578,680 B2
(45) Date of Patent: Feb. 14, 2023

(54) INSERT WITH SEALING GROOVE FOR ENGINE BLOCK AND SYSTEMS, ASSEMBLIES, COMPONENTS, AND METHODS THEREOF

(71) Applicant: Caterpillar Inc., Peoria, IL (US)

(72) Inventors: Andrew D. Rockwell, Marana, AZ (US); Jonathan R. Chittenden, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 155 days.

(21) Appl. No.: 17/039,899

(22) Filed: Sep. 30, 2020

(65) Prior Publication Data

US 2022/0099184 A1    Mar. 31, 2022

(51) Int. Cl.
*F02F 11/00* (2006.01)
*F16J 15/02* (2006.01)
*F16J 10/04* (2006.01)

(52) U.S. Cl.
CPC .......... *F02F 11/005* (2013.01); *F16J 15/022* (2013.01); *F16J 15/021* (2013.01)

(58) Field of Classification Search
CPC ........ F02F 11/005; F02F 11/00; F02F 7/0085; F02F 1/004; F02F 2200/06; F16J 15/022; F16J 15/021; F16J 15/3284; F16J 15/3268
See application file for complete search history.

(56) References Cited

U.S. PATENT DOCUMENTS

| | | | |
|---|---|---|---|
| 3,853,099 A * | 12/1974 | Feather | F02F 11/005 123/41.82 R |
| 3,882,842 A * | 5/1975 | Bailey | F02F 1/163 123/193.2 |
| 4,305,348 A * | 12/1981 | Martin | F02F 1/166 123/41.82 R |
| 5,676,096 A | 10/1997 | Nishi et al. | |
| 6,328,001 B1 | 12/2001 | Kirtley et al. | |
| 7,726,273 B2 * | 6/2010 | Azevedo | F02F 1/20 123/193.2 |
| 9,534,559 B2 | 1/2017 | Donahue | |
| 10,480,499 B2 | 11/2019 | Hebrard et al. | |
| 2006/0097458 A1 | 5/2006 | Boeve | |
| 2007/0227475 A1 | 10/2007 | Hiramitsu et al. | |

(Continued)

FOREIGN PATENT DOCUMENTS

DE   19847865 C2   8/2000
JP   2006233761 A   9/2006

(Continued)

OTHER PUBLICATIONS

Written Opinion and International Search Report for Int'l. Patent Appln. No. PCT/US2021/049577, dated Dec. 24, 2021 (9 pgs).

*Primary Examiner* — Grant Moubry
(74) *Attorney, Agent, or Firm* — Xsensus, LLP

(57) ABSTRACT

An insert for an engine block and systems, assemblies, components, and methods thereof can comprise a ring-shaped body having an inner surface and an outer surface opposite the inner surface. The inner surface can having one or more sealing grooves adapted to receive and retain respective sealing rings. A maximum outer diameter of the ring-shaped body can be defined by the outer surface and can be greater than a height of the ring-shaped body in a longitudinal direction of the ring-shaped body.

20 Claims, 9 Drawing Sheets

(56) References Cited

U.S. PATENT DOCUMENTS

| | | | |
|---|---|---|---|
| 2016/0032681 A1* | 2/2016 | McGruddy | E21B 33/1216 |
| | | | 277/336 |
| 2016/0047331 A1* | 2/2016 | Graham | B23P 19/042 |
| | | | 123/193.2 |
| 2016/0053707 A1 | 2/2016 | Batta | |
| 2016/0177862 A1* | 6/2016 | Batta | F02F 1/004 |
| | | | 123/193.2 |
| 2020/0248645 A1 | 8/2020 | Bochart | |

FOREIGN PATENT DOCUMENTS

| | | | |
|---|---|---|---|
| JP | 5300285 | B2 | 9/2013 |
| JP | 6528736 | B2 | 6/2019 |
| KR | 20140123583 | A | 10/2014 |

* cited by examiner

US 11,578,680 B2

INSERT WITH SEALING GROOVE FOR ENGINE BLOCK AND SYSTEMS, ASSEMBLIES, COMPONENTS, AND METHODS THEREOF

TECHNICAL FIELD

The present disclosure relates to an insert with one or more sealing grooves for an engine block and systems, assemblies, components, and methods thereof and associated therewith.

BACKGROUND

Cylinder liners can have the challenge of balancing liner structure and sealing effectiveness in a lower coolant sealing region between the liner and block. Providing one or more sealing grooves for a sealing element (e.g., o-ring) in the liner may compromise liner structure. On the other hand, accommodating the one or more sealing grooves in the liner may require undesirable thickness for the liner and/or pose challenges with block reconditioning and reusability in this area at first and subsequent engine overhauls.

U.S. Pat. No. 7,726,273 ("the '273 patent") describes a high strength steel cylinder liner for a diesel engine. According to the '273 patent a diesel engine is fitted with a thin-walled wet liner fabricated of steel, where a compound liner thickness to bore diameter is in the range of 1.5 to 4 percent.

SUMMARY OF THE DISCLOSURE

In one aspect, the present disclosure describes an insert for an engine block. The insert can comprise a ring-shaped body having an inner surface and an outer surface opposite the inner surface, where the inner surface can have a plurality of sealing grooves adapted to receive and retain respective sealing rings. A maximum outer diameter of the ring-shaped body can be defined by the outer surface and can be greater than a height of the ring-shaped body in a longitudinal direction of the ring-shaped body. The maximum outer diameter can be constant in the longitudinal direction from a first end portion of the ring-shaped body to a second end portion of the ring-shaped body opposite the first end portion.

In another aspect, the present disclosure describes a method. The method can comprise: providing an insert adapted to be retained in an engine block, the insert being symmetrical and in the form of a ring; and providing at least one sealing ring, each said at least one sealing ring being configured based on a fluid or fluids in the engine block for which to seal. The insert can have an inner surface and an outer surface opposite the inner surface, where the inner surface can have at least one sealing groove adapted to respectively receive and retain the at least one sealing ring. Each said at least one sealing ring can be respectively provided in the at least one sealing groove such that a portion of the at least one sealing ring extends from the at least one sealing groove past the inner surface of the insert.

In yet another embodiment, an assembly for a machined cylinder of a cast-iron engine block of an internal combustion engine is described. The assembly can comprise: a stainless steel insert adapted to be retained in the cast-iron engine block having the machined cylinder, the stainless steel insert being symmetrical and ring-shaped; and a plurality of sealing rings, the sealing rings being o-rings with the same dimensions but with different material compositions based on fluids within the cast-iron engine block for which to seal. The stainless steel insert can have an inner surface and an outer surface opposite the inner surface, where the outer surface can be smooth and can form a maximum outer diameter of the stainless steel insert, and where the inner surface can have a plurality of sealing grooves adapted to receive and retain respective ones of the o-rings. Each said o-ring can be provided in the respective sealing groove such that a portion of the o-ring extends from the sealing groove past the inner surface of the stainless steel insert. Each of a first end of the stainless steel insert and a second end of the stainless steel insert opposite the first end can be chamfered from the outer surface and the inner surface.

Other features and aspects of this disclosure will be apparent from the following description and the accompanying drawings.

DETAILED DESCRIPTION

The present disclosure relates to an insert with one or more sealing grooves for an engine block and systems, assemblies, components, and methods thereof and associated therewith.

Figure 1:
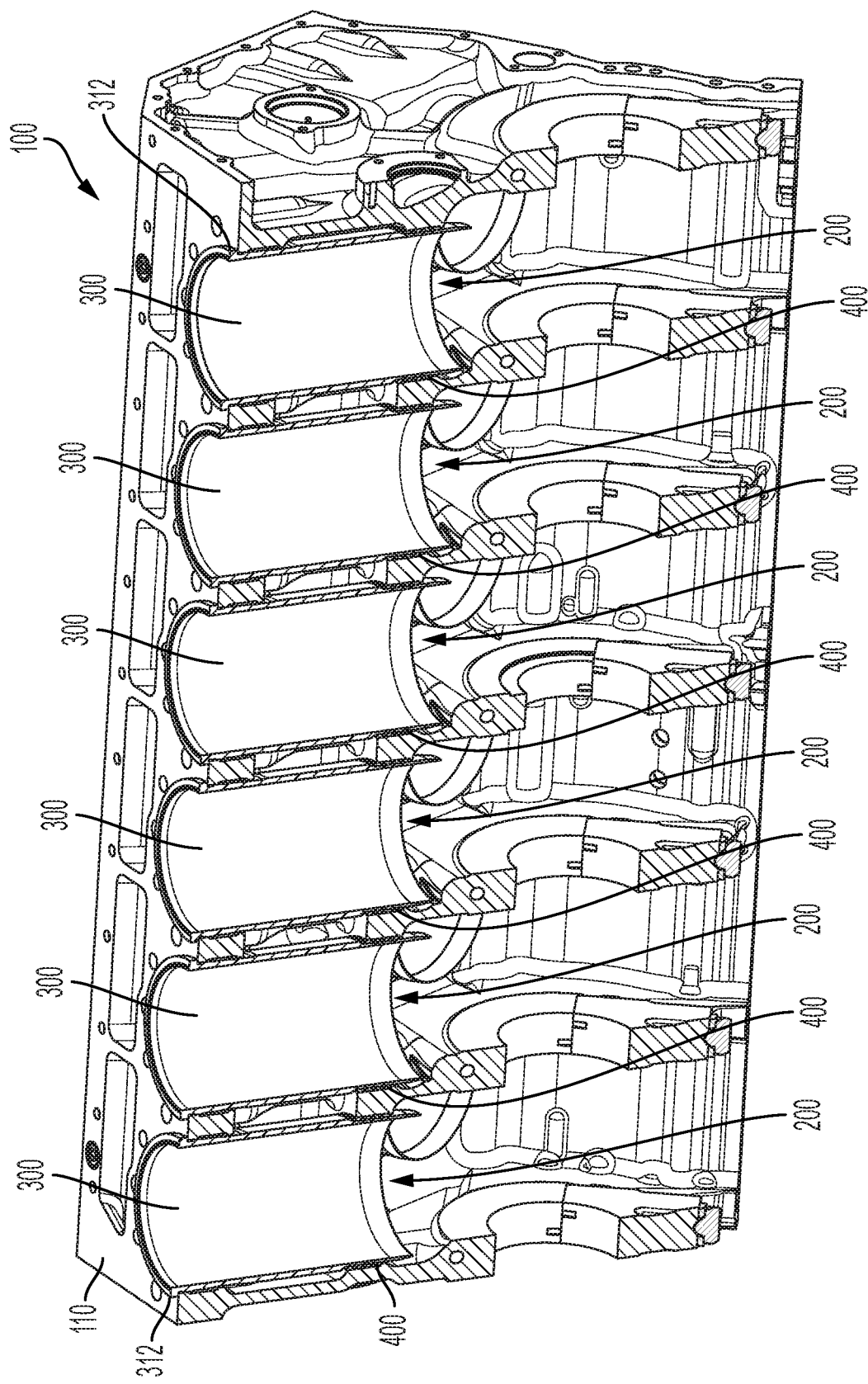
FIG. 1 is a sectional view of a block of an internal combustion engine according to one or more embodiments of the disclosed subject matter.

FIG. 1 is a sectional view of a block 100 of an internal combustion engine according to one or more embodiments of the disclosed subject matter. The internal combustion engine may be any suitable internal combustion engine, including a diesel engine or a gasoline engine. For instance, the block 100 of FIG. 1 is for a diesel engine (V12), though embodiments of the disclosed subject matter are not so limited. That is, embodiments of the disclosed subject matter may be implemented in or applicable to compression ignition and spark ignition engines.

As shown in FIG. 1, the block 100, which may be made of cast-iron, can include a plurality of bores 200. The bores 200 can be cylindrical in nature, hence, the bores 200 may be referred to herein as cylinders 200 (FIG. 1 shows cross sections of half of the cylinders 200 of the block 100). Generally, during operation respective pistons (not expressly shown) can reciprocate within the cylinders 200 due to combustion of fuel to generate mechanical power. Discussed in more detail below, the cylinders 200 may be machined or bored out cylinders 200. Bored out can mean that some of the parent material of the block 100 that defines the cylinder 200 has been bored or machined such that the geometry of the cylinder 200 is changed relative to a previous operational geometry of the internal combustion engine. Previous operational geometry can mean an initial build of the internal combustion engine or a prior rebuild of the internal combustion engine.

Figure 2:
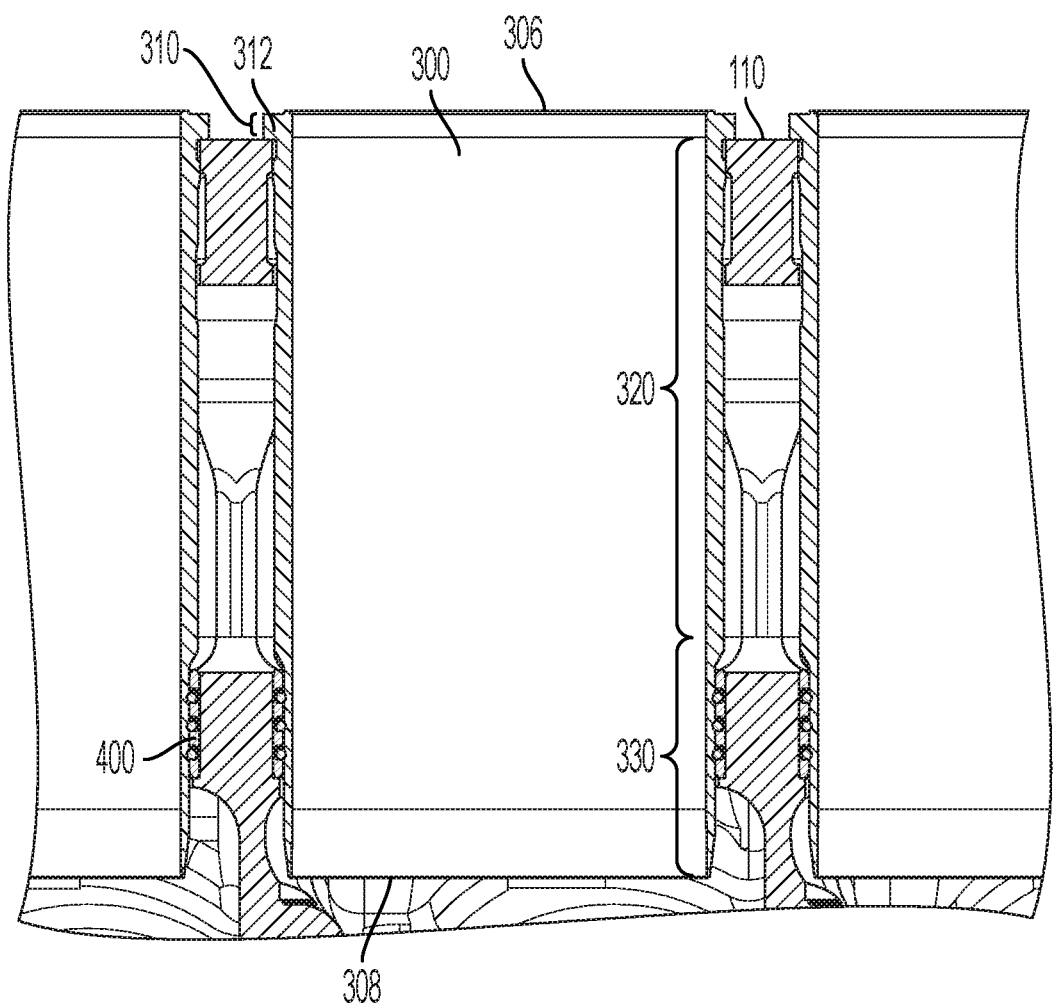
FIG. 2 and FIG. 3 are sectional views of an assembly for a cylinder of the block of FIG. 1, according to one or more embodiments of the disclosed subject matter.
Figure 3:
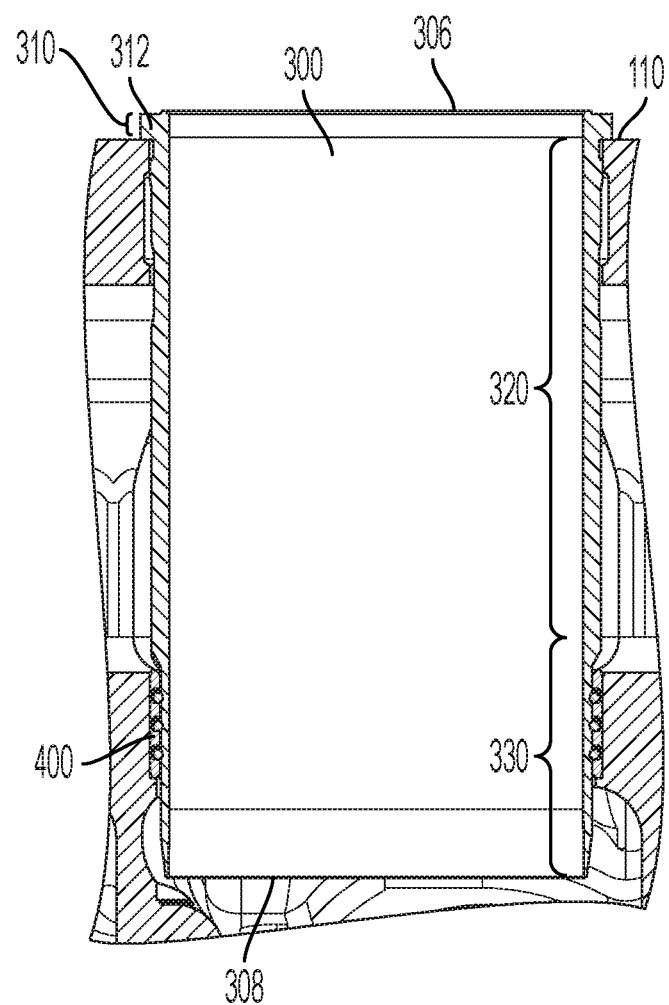
Figure 4:
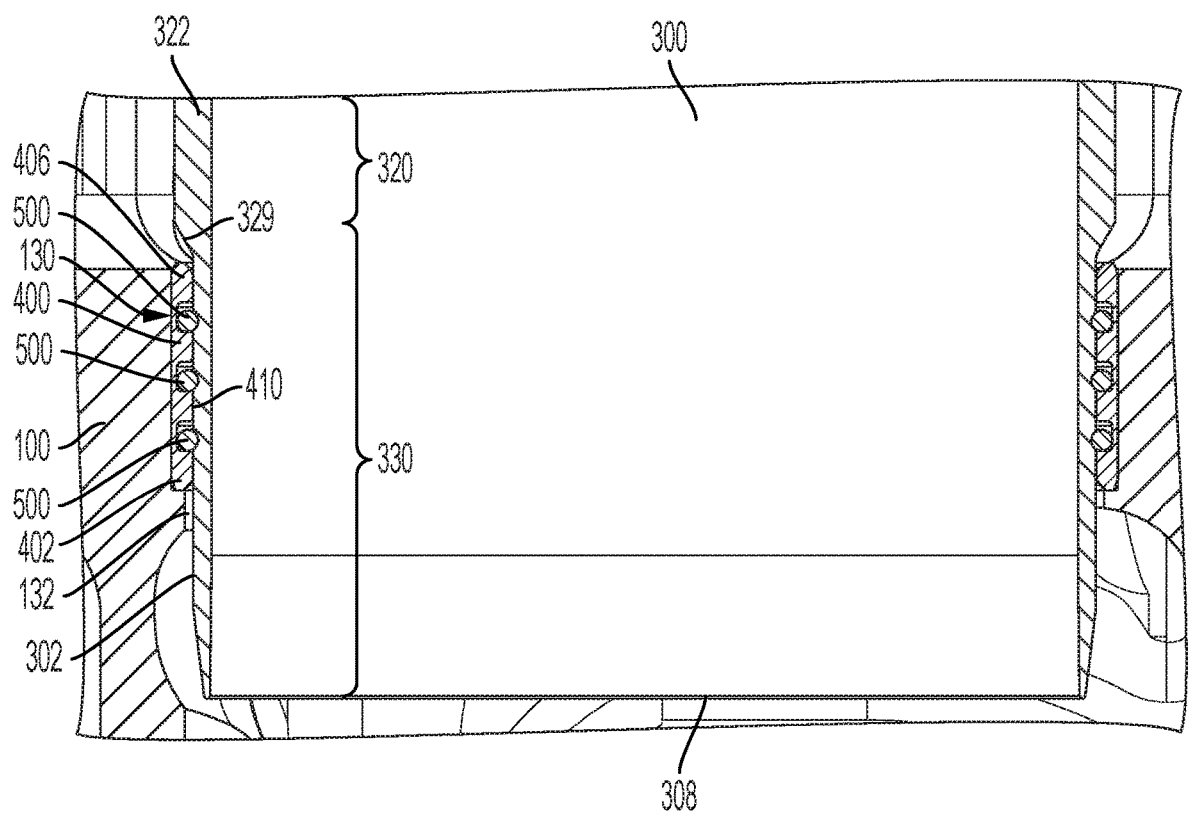
FIG. 4 shows a sectional view of a bottom portion of the assembly of FIG. 2 and FIG. 3.
Figure 5:
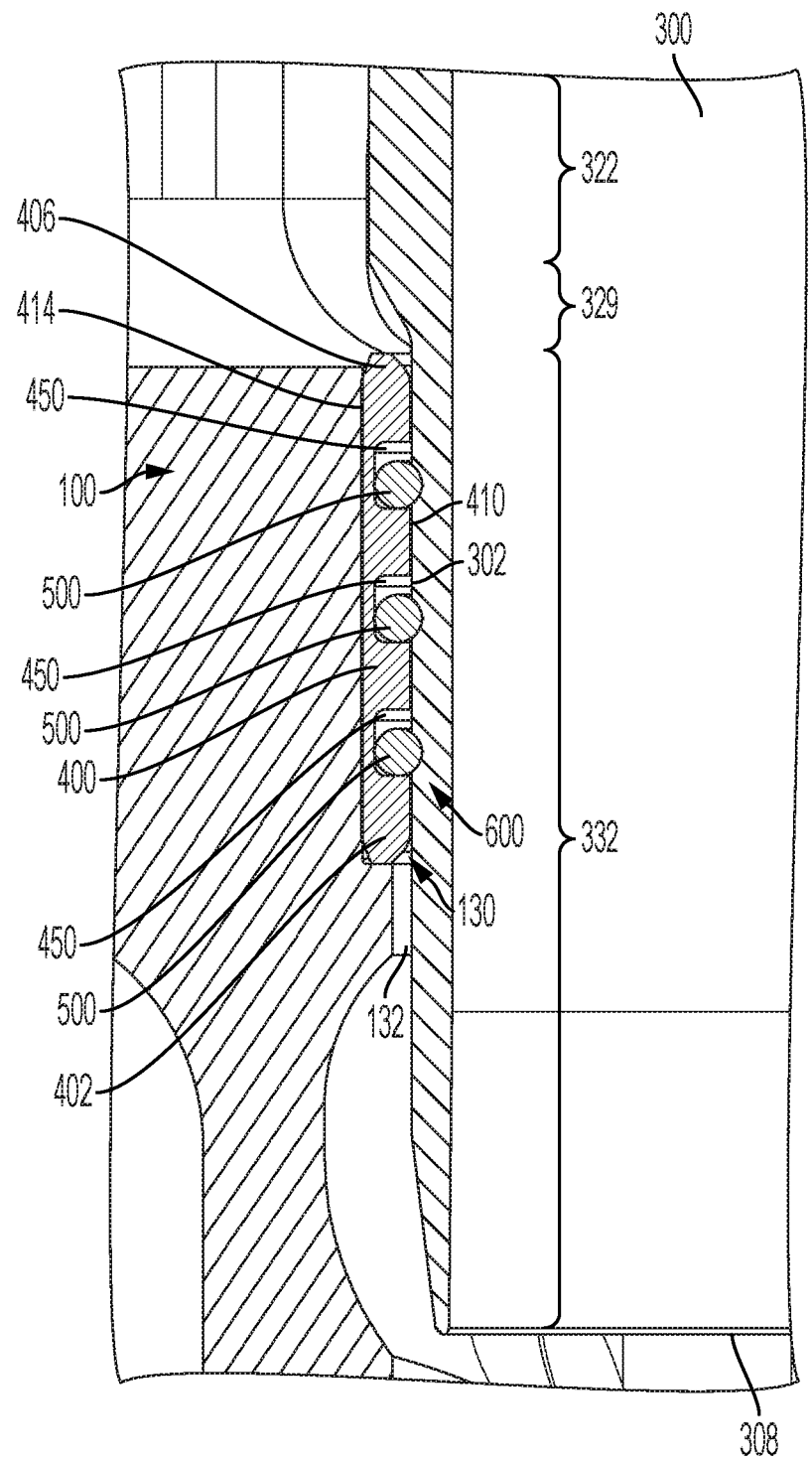
FIG. 5 shows a sectional view of a sealing interface according to embodiments of the disclosed subject matter.

An assembly according to embodiments of the disclosed subject matter can be comprised of a liner 300 and an insert 400, and can be individually provided for some or all of the cylinders 200. Generally, the insert 400 can be provided in the block 100, radially around a bottom portion 330 of the liner 300, such as shown in FIG. 2 and FIG. 3. According to one or more embodiments, the liner 300 can be steel and/or the insert 400 can be stainless steel. The assembly can also comprise one or more sealing rings 500, which can be provided between the insert 400 and the liner 300, such as shown in FIG. 4 and FIG. 5.

The liner 300 may be provided entirely or mostly in the cylinder 200. Optionally, a portion of the liner 300 may protrude from the cylinder 200. For instance, as shown in FIG. 1, FIG. 2, and FIG. 3, a top portion 310 of the liner 300 may extend from a top surface or deck 110 of the block 100. According to one or more embodiments, the liner 300 may be a top-supported liner, meaning that the top portion 310, for instance, a flange 312 thereof, can rest or sit on the top surface 110 of the block 100.

In any case, the liner 300 can be removably provided in the cylinder 200 so as to be radially supported by sidewall portions of the block 100 that define the cylinder 200. According to one or more embodiments, the liner 300 can be inserted and retained in the cylinder 200 via the relatively tight fit of the liner 300 with the sidewall portions defining the cylinder 200. For instance, the liner 300 can be pressed and/or locked in the cylinder 200 via the relatively tight fit of the liner 300 with the sidewall portions defining the cylinder 200. In this regard, the portion(s) of the liner 300 in the cylinder 200 having a maximum outer diameter can be constrained, particularly by an inner diameter of one or more sidewall portions of an upper portion of the block 100. Some or all such sidewall portion(s) may be referred to as pilot(s) (e.g., upper block pilot(s)), and may be used to locate the liner 300 in the cylinder 200.

One or more coolant passages to circulate coolant may be provided between the upper portion of the block 100 and a middle portion 320 of the liner 300. An upper seal, which may be provided just below the flange 312, may provide an upper sealing interface between the upper portion of the block 100 and the middle portion 320 of the liner 300 to seal the one or more coolant passages. According to one or more embodiments the upper sealing interface may be provided by a relatively shallow recess in the liner 300 and may be referred to as a filler band.

Referring to FIG. 4 and FIG. 5, the insert 400 may be provided in a pocket 130 defined in the block 100. The pocket 130 can be defined by a counterbore feature made in the block 100 by machining or boring structure of the block 100. In this regard, the insert 400 may be constrained by the inner diameter of the sidewall portion(s) of the upper portion of the block 120 defining the cylinder 200. That is, according to one or more embodiments, a maximum outer diameter of the insert 400 may be no greater than the inner diameter of one or more sidewall portions of the upper portion 120 of the block 100 that form the inner-most surface(s) of the cylinder 200 (e.g., the pilot portion(s)). The machining process can leave residual parent material of the block 100 to define at least some of the pocket 130. For instance, as shown in FIG. 4 and FIG. 5, a ledge 132 may remain as a surface on which the insert 400 can rest and remain when inserted in the block 100.

An interior or inner surface 410 of the insert 400 may be adapted to sealingly interface with an outer surface 302 of the liner 300, particularly at the bottom portion 330 of the liner 300. Generally, one or more non-metallic seals (e.g., elastomer seals) may be provided. For instance, one or more sealing rings 500 can be provided in respective one or more sealing grooves 450 formed in the inner surface 410 of the insert 400. As shown in FIG. 4 and FIG. 5, for instance, three sealing rings 500 can be provided, though embodiments of the disclosed subject matter are not so limited. The one or more sealing rings 500 can be o-rings, D-rings (i.e., D-shaped cross sectional geometry), have a square cross-sectional geometry, etc.

In the case of multiple sealing rings 500, the sealing rings 500 can have the same dimensions (e.g., cross-section, diameter, etc.) and, therefore, can have the same percentage of fill of the sealing grooves 450. Optionally, some or all of the sealing rings 500 can have the same compressibility (e.g., compression percentage). According to one or more embodiments, the one or more sealing rings 500 can have dimensions (e.g., cross-sectional dimension, such as diameter) greater than a depth of respective ones of the one or more sealing grooves 450 such that a portion of the sealing ring 500 extends from the sealing groove 450, past the inner surface 410 of the insert 400, at least when the insert 400 is provided with the one or more sealing rings 500 and the liner 300 is not provided radially inward of the insert 400. Optionally, the one or more sealing rings 500 may be retained in respective sealing grooves 450 even when the liner 300 is not provided radially inward of the insert 400. As noted above, according to one or more embodiments some or all of the one or more sealing rings 500 may be o-rings, such as shown in FIG. 4 and FIG. 5. Sealing rings of other cross-sectional geometries (e.g., square) may also be implemented according to embodiments of the disclosed subject matter, particularly where a portion of the cross-sectional area may protrude from the sealing groove 450.

The one or more sealing rings 500 may be adapted for the specific geometry of the one or more sealing grooves 450 of the insert 400 and/or the outer surface 302 of the liner 300. The one or more sealing rings 500 may also be adapted based on the material or materials to which the one or more sealing rings 500 will be exposed. In this regard, generally, a seal 600 can be formed by the one or more sealing rings 500 and the liner 300 to provide a barrier for engine coolant at a top portion of the insert 400 and a barrier for engine oil at a bottom portion of the insert 400. Hence, the one or more sealing rings 500 forming the seal 600 can be constituted of a material or materials that may be able to accommodate the particular exposure component or components. Accommodate in this context may mean resistant or proof, for instance, coolant- (including water) or oil-resistant or proof. As an example, in the case of the sealing rings 500 of FIG. 4 and FIG. 5 the top sealing ring 500 can be made of ethylene propylene (EPDM) since the top sealing ring 500 can come into contact with engine coolant, the bottom sealing ring 500 can be made of fluorocarbon (FKM) since the bottom sealing ring 500 can be exposed to oil in the crank case, and/or the middle sealing ring 500 can be formed of a material, such as hydrogenated nitrile butadiene rubber (HNBR), that can handle exposure to both engine coolant and engine oil. Accordingly, the middle sealing ring 500 may serve as a backup to the top and bottom sealing rings 500.

Referring to FIGS. 6-9, the liner 300 can have a hollow body 301 defined by a wall with the external or outer surface 302, the internal or inner surface 304 opposite the outer surface 302, a top end 306 and a bottom end 308 opposite the top end 306. Both the top end 306 and the bottom end 308 can be open.

The body 301 of the liner 300 can be cylindrical, though the thickness of the body 301 can change along the length of the body 301. Optionally, according to one or more embodiments, only the surface profile of the outer surface 302 may change, where an inner diameter of the liner 300 defined by the inner surface 304 can be constant along an entire length of the body 301. As noted above, the body 301 of the liner 300 may be characterized as having the top portion 310, the middle portion 320, and the bottom portion 330.

The top portion 310 of the liner 300, which can include the top end 306, can, according to one or more embodiments, define the flange 312. The flange 312 may define a maximum outer diameter of the outer surface 302 of the liner 300 and/or a maximum thickness of the liner 300.

In terms of relative thickness, generally, the middle portion 320 may be thicker than the bottom portion 330, particularly a so-called thin portion 332 of the bottom portion 330. In this regard, the middle portion 320 may have a so-called thick portion 322, which may form a thickest part of the middle portion 320 (though other portions of the middle portion 320 may have a same thickness). Optionally, the thick portion 322 may be characterized as a pilot portion for placement of the liner 300 in the cylinder 200.

Figure 6:
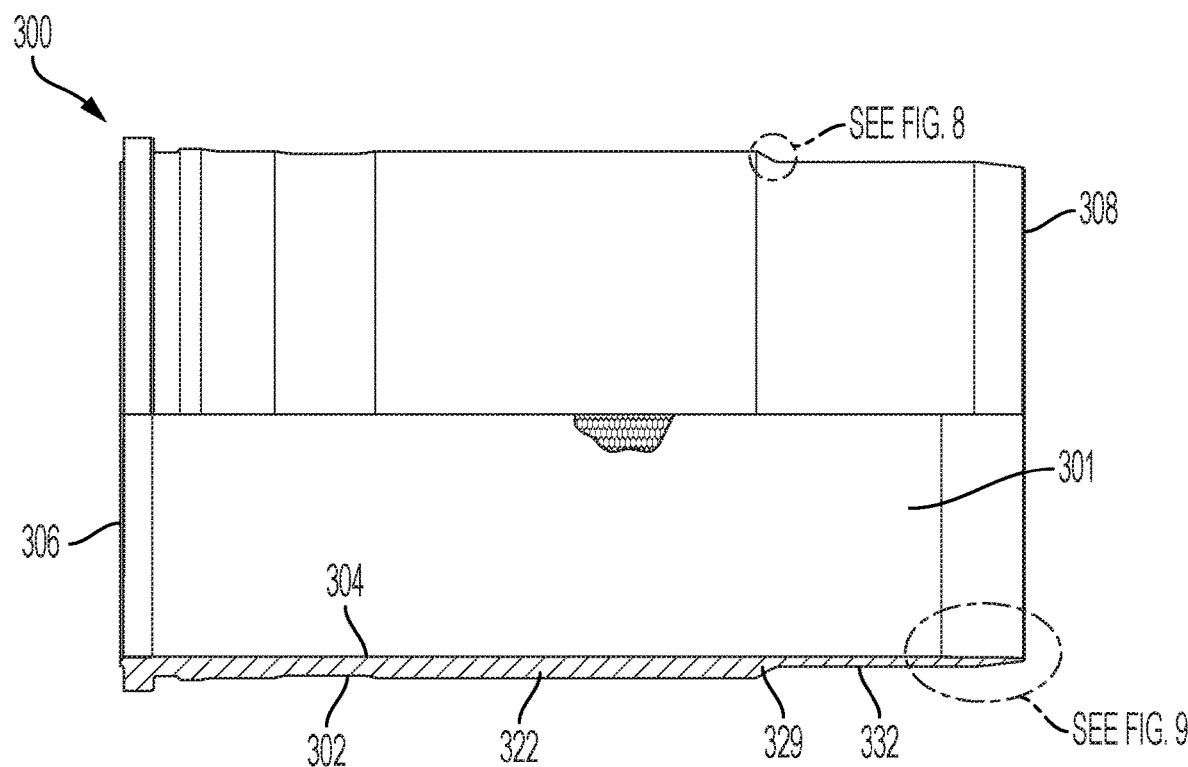
FIG. 6 is a side, partial sectional view of a liner according to one or more embodiments of the disclosed subject matter.
Figure 7:
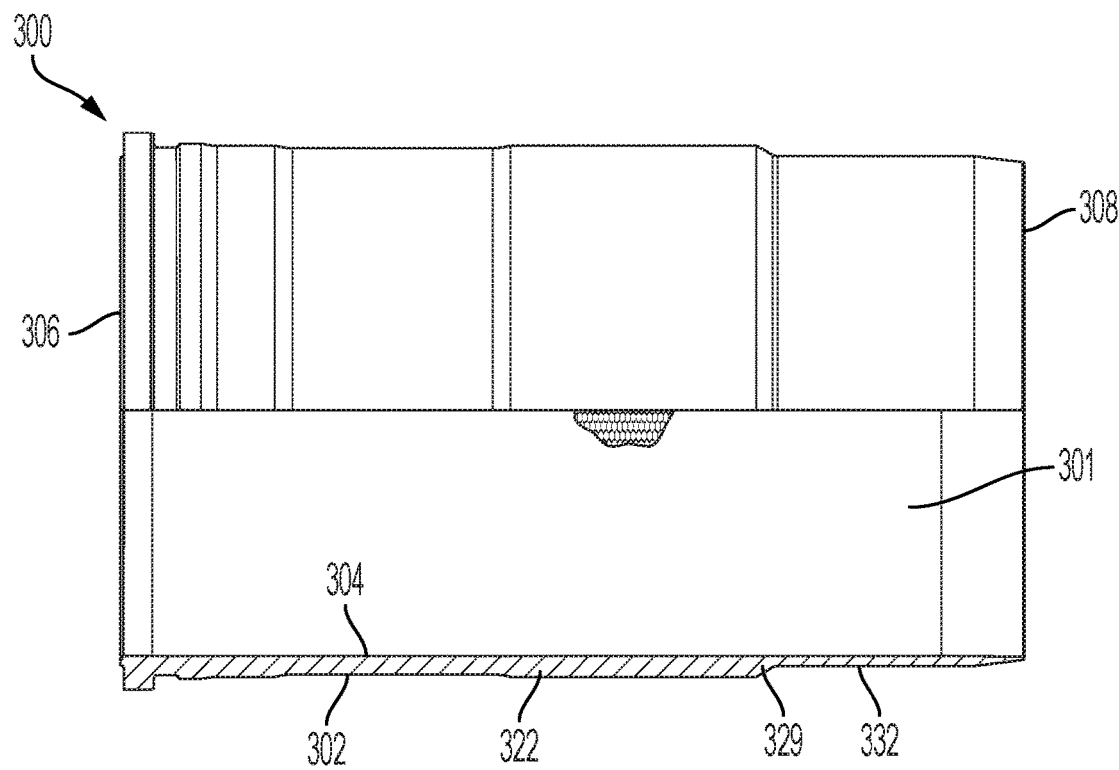
FIG. 7 is a side, partial sectional view of another liner according to one or more embodiments of the disclosed subject matter.

The thick portion 322 may be provided at least at a midway point along the longitudinal length of the liner 300 between the top end 306 and the bottom end 308. In the embodiment of FIG. 6 relative to the embodiment of FIG. 7, the thick portion 322 for the embodiment of FIG. 6 is greater in length as compared to the thick portion 322 for the embodiment of FIG. 7. Thus, the thick portion 322 may be provided at the midway position between the top end 306 and the bottom end 308 of the liner 300, and may, according to one or more embodiments, extend continuously to a transition 329 in thickness. As shown in FIG. 6, the thick portion 322 can also extend in a direction opposite to the transition 329. The thick portion 322 may have uniform thickness along its length, such as shown in FIG. 6 and FIG. 7. Incidentally, the transition 329 and the thin portion 332 of the liners 300 of FIG. 6 and FIG. 7 can be the same for both embodiments. That is, the height at which the transition 329 is provided can be the same, along with the geometries of the transition 329 and the thin portion 332.

Figure 8:
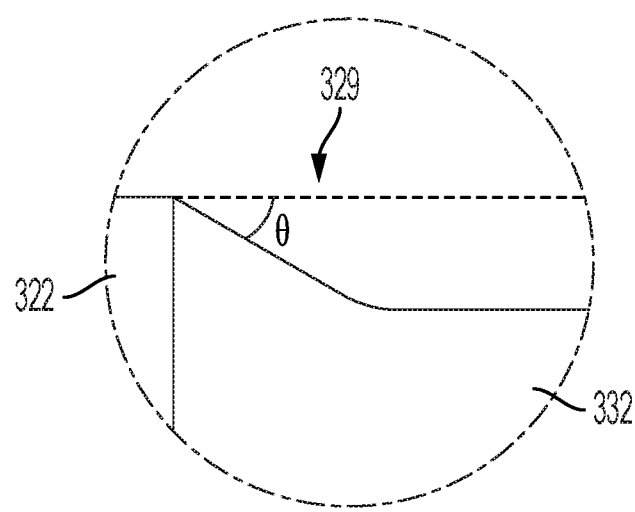
FIG. 8 is an enlarged view of a transition of the liner of FIG. 6.

In any case, the transition 329 in thickness from the thick portion 322 to the thin portion 332 can occur at the bottom portion 330 of the liner 300. As noted above, according to one or more embodiments, the transition 329 may be effected by change in elevation of the outer surface 302 of the liner 300. Referring to FIG. 8, an angle θ for the transition 329 can be an acute angle. Put another way, according to one or more embodiments, the transition 329 may not be square (i.e., 90 degrees).

The thin portion 332 of the liner 330 can extend from the transition 329 to the bottom end 308 of the liner 300. According to one or more embodiments, no portion of the thin portion 322 can be greater in thickness than any portion of the thick portion 322. Likewise, except at the interface with the thick portion 322, no portion of the transition 329 may be greater in thickness than the thick portion 322. Additionally, according to one or more embodiments, no portion of the thin portion 322 may be thicker than any portion of the middle portion 320. In the case of the top portion 310 being at least as thick as the thick portion 322, the thickness comparisons above naturally apply to the top portion 310 relative to the bottom portion 330 of the liner 300.

Figure 9:
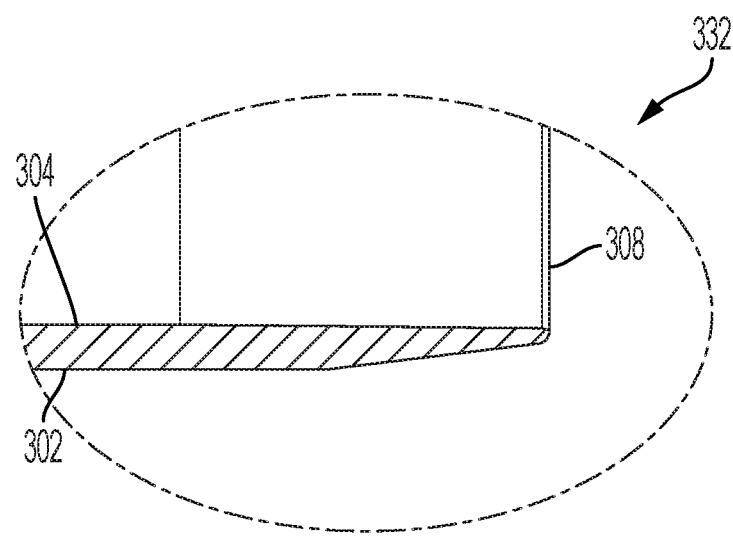
FIG. 9 is an enlarged view of a portion of a bottom portion of the liner of FIG. 6.
Figure 10:
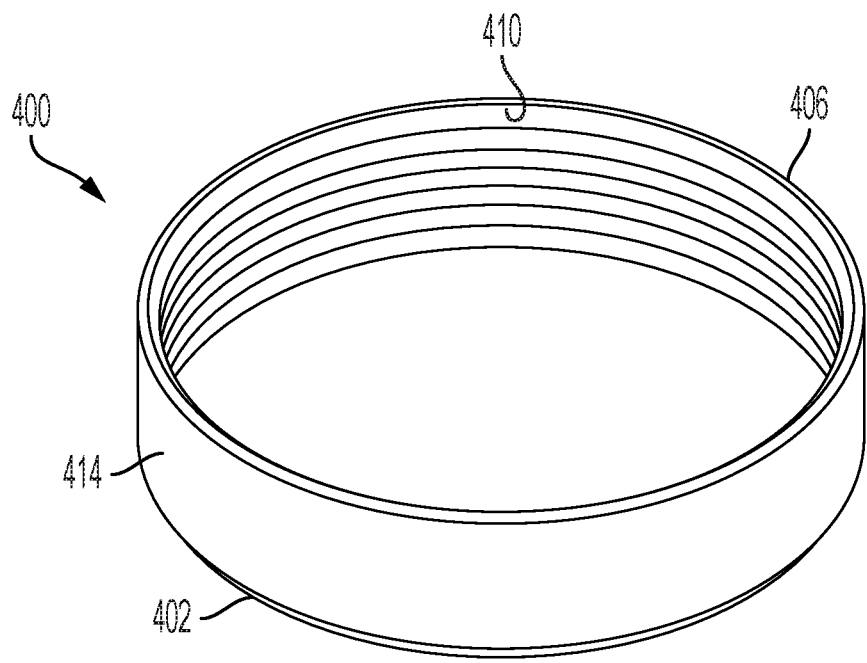
FIG. 10 is a perspective view of an insert according to one or more embodiments of the disclosed subject matter.

Optionally, the thin portion 332 can taper in thickness to the bottom end 308. As noted above, the taper can apply to the outer surface 302 of the liner 300. As shown in FIG. 9, for instance, the thin portion 332 can be thinnest at the bottom end 308 of the liner 300. Hence, the liner 300 may have its thinnest part at the bottom end 308 of the liner 300.

The outer surface 302 of the liner 300 may be entirely or partially without any sealing grooves adapted to receive a sealing ring, such as a D-ring or an o-ring. According to one or more embodiments, the outer surface 302 may be entirely without any such sealing grooves at the bottom portion 330 of the liner 300. Nevertheless, the outer surface 302 at the bottom portion 330 of the liner 300 can be adapted to sealingly interface with an insert assembly according to embodiments of the disclosed subject matter, such as an insert assembly comprised of the insert 400 and the one or more sealing rings 500 discussed herein.

Figure 11:
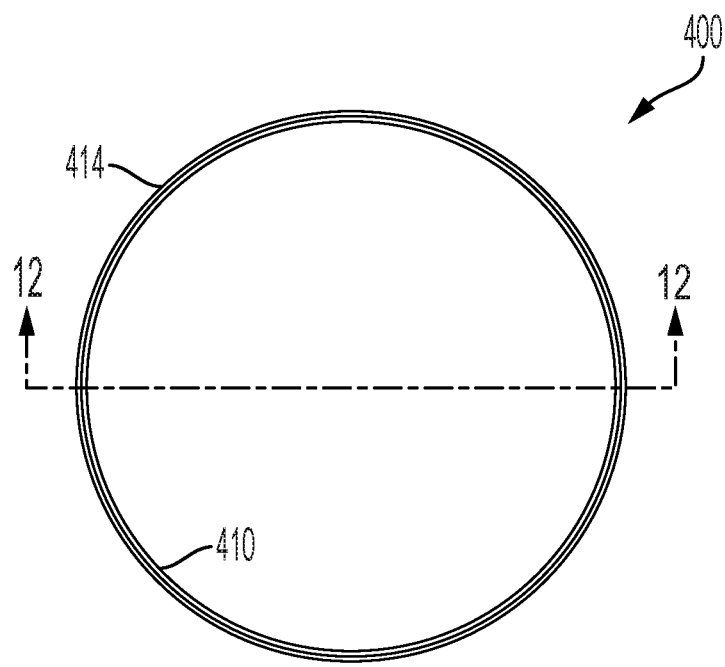
FIG. 11 is an end view of the insert of FIG. 10.

Turning now to FIGS. 10-13, the insert 400, which may be referred to as a sleeve, can have a body in the form of a cylindrical ring, or ring-shaped, with a hollow interior and open first and second ends 402, 406. Thus, in the end view, such as shown in FIG. 11, the insert 400 can be circular.

Figure 12:
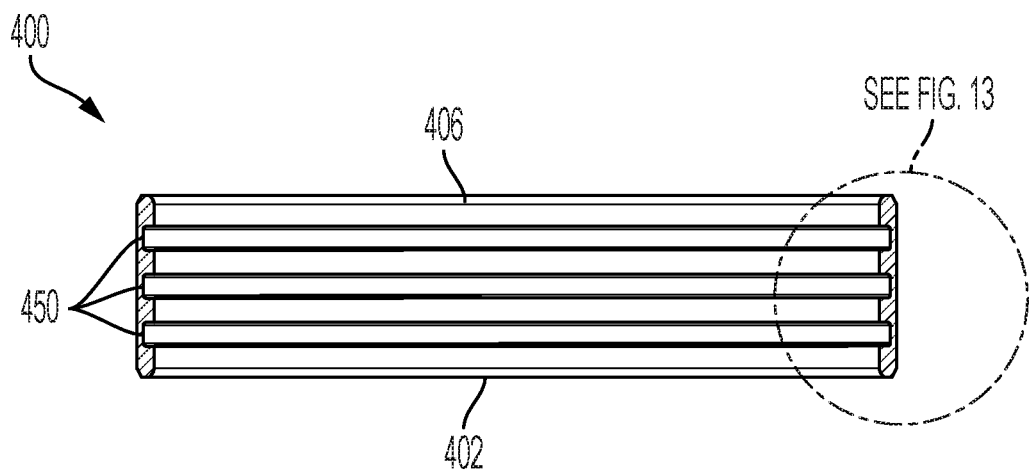
FIG. 12 is a sectional view of the insert of FIG. 11 along line 12-12.

The insert 400 can have the interior or inner surface 410 and the exterior or outer surface 414 opposite the inner surface 410. The outer surface 414, which may be smooth, can define a maximum outer diameter of the insert 400. Optionally, the first end 402 and the second end 406 may be chamfered on the outer surface 414 and/or the inner surface 410. As shown in FIG. 12, the insert 400 can be chamfered on both the inner surface 410 and the outer surface 414. Moreover, such chamfering at the outer surface 414 and/or the inner surface 410 can be at one or both of the first end 402 and the second end 406. FIG. 12, for instance, shows both the first end 402 and the second end 406 being chamfered. Alternatively, the inner surface 410 and/or the outer surface 414 may have a radius (curved) geometry or a square geometry at the first end 402 and/or the second end 406 of the insert 400.

The insert 400 can have one or more sealing grooves 450 formed or provided in the inner surface 410. Insert 400, for instance, has three sealing grooves 450. The sealing grooves 450 may extend around an entire circumference of the inner surface 410 of the insert 400, and can be adapted to receive and retain respective sealing rings, such as sealing rings 500 shown in FIG. 4.

Figure 13:
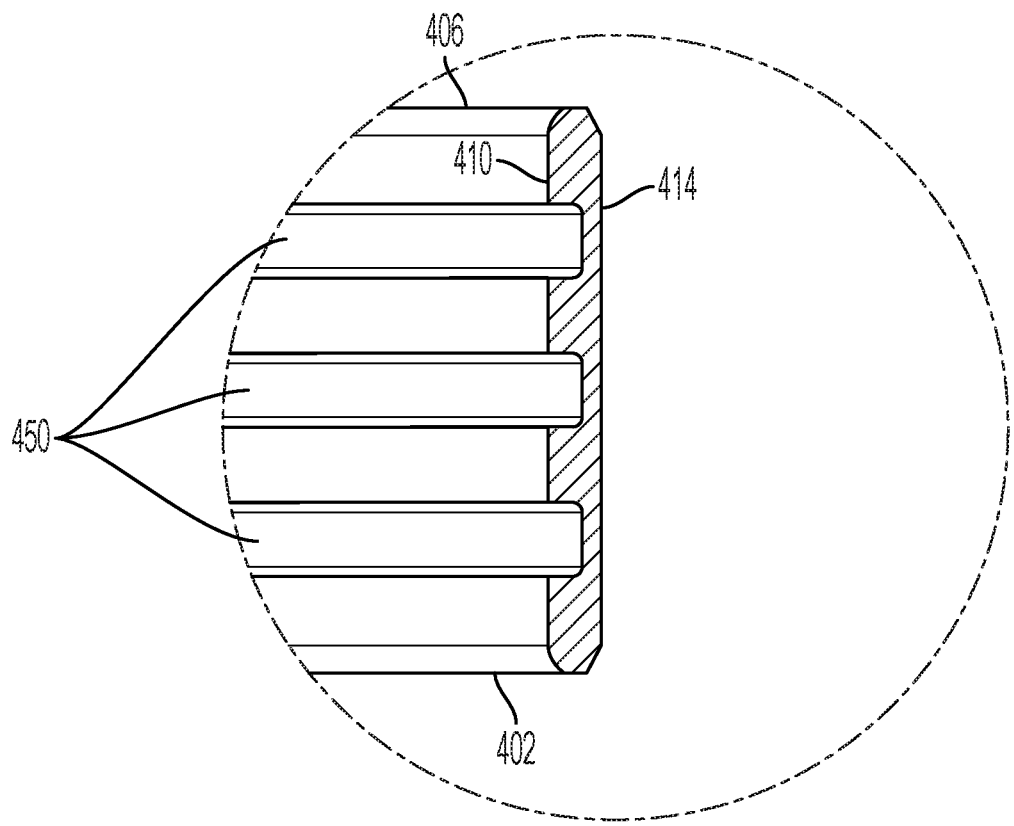
FIG. 13 is an enlarged portion of the sectional view of FIG. 12.

In the case of multiple sealing grooves 450, the sealing grooves 450 may be evenly spaced from each other in the longitudinal or height direction of the insert 400. Optionally, the sealing grooves 450 may also be evenly spaced from each other and the first and second ends 402, 406, such as shown in FIG. 13. Alternatively, the sealing groove(s) 450 may be asymmetric relative to the first end 402 and the second end 406 of the insert 400 and/or with respect to each other in the case of multiple sealing grooves 450. Moreover, according to one or more embodiments, the geometry of the sealing grooves 450 may be the same. Thus, the dimensions of the sealing grooves 450 may be the same. Alternatively, the geometry (e.g., dimensions) of one or more of the sealing grooves 450 may be different compared to one or more other of the sealing grooves 450. According to embodiments of the disclosed subject matter, the insert 400 can be symmetrical in all aspects.

The depth of the sealing grooves 450 can be driven by an amount of compression for a corresponding sealing ring 500 provided therein. Optionally, the depth of the sealing groove 450 can be based on retention of the sealing ring 500 in the sealing groove, for instance, prior to and/or during insertion of the liner 300.

As discussed above, the insert 400 can be adapted to be retained in the pocket 130 of the block 100 to receive the liner 300 such that the insert 400 radially surrounds only the thin portion 332 of the liner 300. The sealing rings 500 can be provided in the respective sealing grooves 450, and can contact the outer surface 302 of the liner 300 to form the seal 600.

INDUSTRIAL APPLICABILITY

As noted above, the present disclosure relates to an insert with one or more sealing grooves for an engine block and systems, assemblies, components, and methods thereof and associated therewith.

Embodiments of the disclosed subject matter can balance liner structural adequacy and sealing effectiveness in the lower coolant sealing region between the liner and block. In this regard, embodiments of the disclosed subject matter can provide a sealing system between a liner in a cylinder and the block of an internal combustion engine in a constrained geometric space to prevent or minimize the mixing together of engine coolant and engine oil in the engine block.

The liner, such as liner 300, can have a variable wall thickness along its length, with a relatively thick portion transitioning to a relatively thin portion at a bottom portion of the liner 300. The relatively thick portion of the liner 300 can be for structural adequacy to account for combustion, firing pressure, cavitation, piston side loads, etc. in order to protect the surrounding block, whereas the relatively thin portion of the liner 300 in the bottom portion can be to provide a suitable seal between the liner 300 and the block (and since the bottom portion of the liner 300 may experience comparatively less stress due to combustion, firing pressure, cavitation, piston side loads, etc.).

At least at the thin portion the liner 300 can be without any sealing grooves adapted to receive respective sealing rings. Rather, a sleeve or insert, such as insert 400, can be provided with one or more sealing rings, such as sealing rings 500, in respective sealing grooves formed in an inner surface of the insert 400. The relatively thin portion of the liner 300 can provide room for the insert 400 and sealing ring(s) 500 of sufficient configuration (e.g., cross-sectional size) to provide a suitable seal with the liner 300. That is, the outer diameter of the insert 400 can be constrained by the maximum counterbore diameter that can be machined in the block. Hence, making the bottom portion of the liner 300 relatively thin can provide space in the radially outward direction to accommodate the insert 400 and sealing ring(s) 500 of suitable configuration without running afoul of the constraints on the outer diameter of the insert 400. In this regard, according to one or more embodiments, the one or more sealing rings 500 can be o-rings, rather than D-rings, for instance, thereby affording the opportunity to provide a sealing ring having with greater relative cross-sectional area.

Use of the insert 400 (with the sealing ring(s) 500) can enable cost-effective reconditioning of the block 100 at overhaul (e.g., first or subsequent overhauls), for instance, as compared to a situation where the sealing ring(s) are placed in the block 100 itself, because the insert 400 can be replaced, if needed, rather than having to machine the sealing groove(s) in situ.

As noted above, the block 100 can include a plurality of cylinders, such as cylinders 200, where cylinders 200 may be machined or bored out. Bored out can mean that some of the parent material of the block 100 that defines the cylinder 200 has been bored or machined such that the geometry of the cylinder 200 is changed relative to a previous operational geometry of the internal combustion engine. Previous operational geometry can mean an initial build of the internal combustion engine or a prior rebuild of the internal combustion engine.

An assembly according to embodiments of the disclosed subject matter, which can be comprised of a liner 300, an insert 400, and one or more sealing rings 500, can be individually provided for some or all of the cylinders 200. Generally, the insert 400 can be provided in the block 100, along with the one or more sealing rings 500, radially around the bottom portion 330 of the liner 300, such as shown in FIGS. 2-5. According to one or more embodiments, the liner 300 can be steel and/or the insert 400 can be stainless steel. Stainless steel as the material for the insert 400 can provide suitable wear characteristics against the liner 300 when the liner 300 is made of steel.

Referring to FIG. 4 and FIG. 5, the insert 400 may be provided in the pocket 130 defined in the block 100. In that the pocket 130 can be defined by a counterbore feature made in the block 100 by machining or boring structure of the block 100, the insert 400 may be constrained by the inner diameter of the sidewall portion(s) of the upper portion of the block 100 defining the cylinder 200. That is, according to one or more embodiments, a maximum outer diameter of the insert 400 may be no greater than the inner diameter of one or more sidewall portions of the upper portion of the block 100 that form the inner-most surface(s) of the cylinder 200 (e.g., the pilot portion(s)). This way, during installation, the insert 400 can be moved through the inner volume defining the upper portion of the cylinder 200 for placement in the pocket 130.

The outer surface 414 of the insert 400 can be chamfered at the first end 402 of the insert 400 and/or at the second end 406 of the insert 400. Such chamfered outer surface 414 can assist with ease of installation of the insert 400 into the pocket 130. Such chamfered outer surface 414 may also assist with ease of installation of the insert 400 through the upper portion of the cylinder 200 when the first end 402 or the second end 406 of the insert 400 is the lead end of the insert 400 into the cylinder 200. In this regard, the insert 400 may be symmetrical entirely or at least with respect to the outer surface 414 at the first end 402 and the second end 406 of the insert 400. Thus, according to embodiments of the disclosed subject matter, the orientation of the insert 400 for installation, i.e., whether the first end 402 or the second end 406 of the insert 400 forms the leading end of the insert 400 into the cylinder 200, may not form a consideration for installation. In any case, the lead end of the insert 400, whether the second end 406 or the first end 402, such as shown in FIG. 4 and FIG. 5, can be provided in the pocket 130 so as to rest and be retained on the ledge 132 (which can be residual parent material of the block 100). Though FIG. 4 and FIG. 5, for instance, show the insert 400 being provided in the block 200 according to an interference fit, embodiments of the disclosed subject matter are not so limited. Accordingly, the insert 400 can be provided in the block 200 via other interfacing, such as threading, its own bore, staking, welding, and pinning.

One or more sealing rings 500 may be provided in respective one or more sealing grooves 450 formed in the inner surface 410 of the insert 400. As shown in FIG. 4 and FIG. 5, for instance, three sealing rings 500 can be provided, though embodiments of the disclosed subject matter are not so limited. The one or more sealing rings 500 can be retained in the respective sealing grooves 450 when the liner 300 is not provided radially inward of the insert 400. Thus, the one or more sealing rings 500 may be provided in the respective one or more sealing grooves 450 for installation in combination with the insert 400. Alternatively, the insert 400 can be provided in the cylinder 200 and the one or more sealing rings 500 provided in the respective one or more sealing grooves 450 once the insert 400 is positioned in the pocket 130. In this regard, the sealing ring(s) 500 may be removed from the insert 400 when the insert is in the pocket 130 (and the liner 300 is not present) and/or upon removal of the insert 400 itself from the cylinder 200.

Providing the sealing ring(s) 500 in the insert 400 rather than the liner 300 can allow for the use of relatively thick (e.g., greater in cross-sectional diameter) sealing ring(s) 500, particularly o-rings, since the sealing ring(s) 500 are already in place upon insertion of the liner 300 in the cylinder 200. According to one or more embodiments, the one or more sealing rings 500 can have dimensions (e.g., cross-sectional dimension, such as diameter) greater than a depth of respective ones of the one or more sealing grooves 450 such that a portion of the sealing ring 500 extends from the sealing groove 450, past the inner surface 410 of the insert 400, at least when the insert 400 is provided with the one or more sealing rings 500 and the liner 300 is not provided radially inward of the insert 400.

The liner 300 can be provided in the cylinder 200 after the insert 400 and sealing ring(s) 500. As noted above, the liner 300 can be removably provided (e.g., inserted, pressed, etc.) in the cylinder 200 and subject to relatively tight fit with the sidewall portions defining the cylinder 200. According to one or more embodiments, the liner 300 can be locked in the cylinder 200. In this regard, the portion(s) of the liner 300 in the cylinder 200 having a maximum outer diameter can be constrained, particularly by an inner diameter of one or more sidewall portions of an upper portion of the block 100. Some or all such sidewall portion(s) may be referred to as pilot(s) (e.g., upper block pilot(s)), and may be used to locate the liner 300 in the cylinder 200.

When the liner 300 is provided in the cylinder 200 the insert 400 and sealing ring(s) 500 can radially surround an outer or external wall or surface 302 at a portion of the bottom portion 330 of the liner 300, such as shown in FIG. 4. According to one or more embodiments, the insert 400 can be provided entirely below the transition 329 in the body 301 of the liner 300 from the thick portion 322 of the liner 300 to the thin portion 332 of the liner 300. Moreover, the insert 400 can be provided around only the thin portion 332, for instance, a portion thereof spaced from the bottom end 308 of the liner 300.

The inner surface 410 of the insert 400 can be chamfered at the first end 402 of the insert 400 and/or the second end 406 of the insert 400 (the insert 400 can be symmetrical in this regard), wherein when the trailing end of the first end 402 and the second end 406 of the insert 400 has a chamfered inner surface 410 the chamfer can facilitate placement of the liner 300 through the inner volume of the insert 400. Additionally, as the liner 300 is seated in the cylinder 200 the outer surface 302 of the liner 300 can contact the sealing ring(s) 500 such that the sealing ring(s) 500 compress. In that the sealing ring(s) 500 can be retained in respective sealing groove(s) 450 and the liner 300 can have the thin portion 332 that can taper, from the outer surface 302, to a thinnest portion of the body 301 of the liner 300, each sealing ring 500 can interface with the outer surface 302 of the liner 300 such that the sealing ring(s) 500 do not roll or are less likely to roll as the liner 300 is moved down in the cylinder 200 over a length of insertion.

In any case, a seal may be formed by each of the one or more sealing rings 500 and the outer surface 302 of the liner 300. Such seals may be collectively referred to herein as the seal 600. As noted above, the seal 600 can be relative to the thin portion 332 of the liner 300, below the transition 329.

The transition 329 in thickness from the thick portion 322 to the thin portion 332 can occur at the bottom portion 330 of the liner 300. As noted above, according to one or more embodiments, the transition 329 may be effected by change in elevation of the outer surface 302 of the liner 300. Referring to FIG. 8, the angle θ for the transition 329 can be an acute angle. Put another way, according to one or more embodiments, the transition 329 may not be square (i.e., 90 degrees). Providing a non-square angle for the transition 329 can provide a configuration whereby dead space or volume for engine coolant between the transition 329 and the block 100 is not created or is minimized. Such configuration can prevent or minimize cavitation of stagnated engine coolant since such condition is prevented or minimized.

In terms of relative thickness, generally, the middle portion 320 may thicker than the bottom portion 330, particularly a so-called thin portion 332 of the bottom portion 330. In this regard, the middle portion 320 may have a so-called thick portion 322, which may form a thickest part of the middle portion 320 (though other portions of the middle portion 320 may have a same thickness). Optionally, the thick portion 322 may be characterized as a pilot portion for placement of the liner 300 in the cylinder 200.

The thick portion 322 may be provided at least at a midway point along the longitudinal length of the liner 300 between the top end 306 and the bottom end 308. In the embodiment of FIG. 6 relative to the embodiment of FIG. 7, the thick portion 322 for the embodiment of FIG. 6 is greater in length as compared to the thick portion 322 for the embodiment of FIG. 7. Thus, the thick portion 322 may be provided at the midway position between the top end 306 and the bottom end 308 of the liner 300, and may, according to one or more embodiments, extend continuously to a transition 329 in thickness. As shown in FIG. 6, the thick portion 322 can also extend in a direction opposite to the transition 329. The thick portion 322 may have uniform thickness along its length, such as shown in FIG. 6 and FIG. 7. As noted above, the transition 329 and the thin portion 332 of the liners 300 of FIG. 6 and FIG. 7 can be the same for both embodiments. That is, the height at which the transition 329 is provided can be the same, along with the geometries of the transition 329 and the thin portion 332.

The thin portion 332 of the liner 330 can extend from the transition 329 to the bottom end 308 of the liner 300. According to one or more embodiments, no portion of the thin portion 322 can be greater in thickness than any portion of the thick portion 322. Likewise, except at the interface with the thick portion 322, no portion of the transition 329 may be greater in thickness than the thick portion 322. Additionally, according to one or more embodiments, no portion of the thin portion 322 may be thicker than any portion of the middle portion 320. In the case of the top portion 310 being at least as thick as the thick portion 322, the thickness comparisons above naturally apply to the top portion 310 relative to the bottom portion 330 of the liner 300.

Non-limiting examples of thickness characteristics for one or more embodiments of the disclosed subject matter are provided below.

The thickness of the body 301 of the liner 300 above the transition 329 can have an average wall thickness to bore ratio between 3.5 to 4.5%. Below 3.5% may cause concern for the structural strength, whereas greater than 4.5% may not be practical without sacrificing engine displacement.

The thickness of the body 301 of the liner 300 below the transition 329 can have a thickness to bore ratio between 1.5 to 2.5%. Below 1.5% may cause concern for structural strength (even at this lower stress area of the liner 300), whereas greater than 2.5% may not provide enough room to use suitable sealing rings 500 (e.g., o-rings).

The ratio of the thickness of the body 301 of the liner 300 above the transition 329 and the thickness of the body 301 below the transition 329 can be between 1.5 to 3.

The thickness of the thin portion 332 can represent 20-40% of the total liner length. Less than 20% may not provide enough length to place the sealing ring(s) 500, whereas greater than 40% may not provide sufficient strength for stresses occurring higher in the cylinder 200.

The ratio between the thickness of the thin portion 332 and the diameter of the sealing ring 500 (e.g., o-ring) can be less than one. This can enable a relatively large o-ring 500 against a relatively thin liner 300.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. An assembly for a machined cylinder of a cast-iron engine block of an internal combustion engine, comprising:
   a stainless steel insert adapted to be retained in the cast-iron engine block having the machined cylinder, the stainless steel insert being ring-shaped and symmetrical from at least side and end elevational views of the stainless steel insert; and
   a plurality of sealing rings, the sealing rings being o-rings with e same dimensions but with different material compositions based on fluids within the cast-iron engine block for which to seal,
   wherein the stainless steel insert has an inner surface and an outer surface opposite the inner surface, the outer surface being smooth and forming a constant maximum outer diameter of the stainless steel insert from a first end portion of the stainless steel insert to a second end portion of the stainless steel insert opposite the first end portion, and the inner surface having a plurality of sealing grooves adapted to receive and retain respective ones of the o-rings,
   wherein each said O-ring is provided in the respective sealing groove such that a portion of the o-ring extends from the sealing groove past the inner surface of the stainless steel insert, and
   wherein each of a first end of the stainless steel insert associated with the first end portion of the stainless steel insert and a second end of the stainless steel insert opposite the first end and associated with the second end portion of the stainless steel insert is chamfered from the outer surface and the inner surface.

2. The assembly according to claim 1, wherein the constant maximum outer diameter of the stainless steel insert is no greater than an inner diameter of the machined cylinder defined by one or more pilot portions of the cast-iron engine block.

3. The assembly according to claim 1,
   wherein the plurality of o-rings include a first O-ring as an upper O-ring, a second O-ring as a middle o-ring, and a third o-ring as a lower O-ring, and
   wherein the first o-ring is adapted to contact engine coolant, the third o-ring is adapted to contact engine oil, and the second O-ring is adapted to contact engine coolant and engine oil.

4. The assembly according to claim 3, wherein the first O-ring is made of ethylene propylene (EPDM), the third o-ring is made of fluorocarbon (FKM), and the second o-ring is made of hydrogenated nitrile butadiene rubber (HNBR).

5. The assembly according to claim 1, wherein the plurality of o-rings are unevenly spaced from the first and second ends of the stainless steel insert.

6. The assembly according to claim 1, wherein the plurality of o-rings are evenly spaced from each other and the first and second ends of the stainless steel insert.

7. The assembly according to claim 1, wherein the first end of the stainless steel insert is adapted to rest on a parent ledge in the machined cylinder of the cast-iron engine block.

8. The assembly according to claim 1, wherein the O-rings are adapted to create a seal between the stainless steel insert and an outer surface of a body of a steel liner provided in the machined cylinder.

9. The assembly according to claim 1, wherein the stainless steel insert and the O-rings are adapted to be provided radially around and in contact with an outer surface of a thin portion of a cylindrical liner provided in the machined cylinder.

10. The assembly according to claim 1, wherein the stainless steel insert has a height in a longitudinal direction less than a width defined by the outer surface.

11. A method comprising:
    providing an insert adapted to be retained in an engine block, the insert being symmetrical and in the form of a ring; and
    providing at least one sealing ring, each said at least one sealing ring being configured based on a fluid or fluids in the engine block for which to seal,
    wherein the insert has an inner surface and an outer surface opposite the inner surface, the inner surface having at least one sealing groove adapted to respectively receive and retain the at least one sealing ring,
    wherein each said at least one sealing ring is respectively provided in the at least one sealing groove such that a portion of the at least one sealing ring extends from the at least one sealing groove past the inner surface of the insert,
    wherein the insert has a uniform outer diameter defined by the outer surface from a first end portion of the insert to a second end portion of the insert opposite the first end portion, and
    wherein the insert is made entirely of a metal.

12. The method according to claim 11, where said providing the insert is such that the insert is seated in a pocket in the engine block.

13. The method according to claim 11, where said providing the insert and said providing the at least one sealing ring are prior to providing the insert and the at least one sealing ring in the engine block.

14. The method according to claim 11, wherein the metal is stainless steel.

15. The method according to claim 11, wherein each said at least one sealing ring is made of a non-metallic material.

16. An insert for an engine block comprising
a ring-shaped body having an inner surface and an outer surface opposite the inner surface, the inner surface having a plurality of sealing grooves adapted to receive and retain respective sealing rings,
wherein a maximum outer diameter of the ring-shaped body defined by the outer surface is greater than a height of the ring-shaped body in a longitudinal direction of the ring-shaped body, and
wherein the maximum outer diameter is constant in the longitudinal direction from a first end portion of the ring-shaped body to a second end portion of the ring-shaped body opposite the first end portion,
wherein the ring-shaped body is symmetrical from at least a side view of the ring-shaped body, and
wherein the ring-shaped body is made entirely of steel.

17. The insert according to claim 16, wherein the steel is stainless steel.

18. The insert according to claim 16, wherein the first end portion and/or the second end portion are chamfered.

19. The insert according to claim 16, wherein the sealing grooves are adapted to receive and retain respective o-rings as the sealing rings.

20. The insert according to claim 16, wherein the insert is adapted to rest on a parent ledge of a bored out cylinder of the engine block.

* * * * *